(12) United States Patent
Duplin et al.

(10) Patent No.: US 11,598,647 B1
(45) Date of Patent: Mar. 7, 2023

(54) MARINE TRAFFIC DEPICTION FOR PORTABLE AND INSTALLED AIRCRAFT DISPLAYS

(71) Applicant: Lockheed Martin Corporation, Bethesda, MD (US)

(72) Inventors: Roderick S. Duplin, Downington, PA (US); Simon J. Gharibian, Madison, CT (US); Robert S. Takacs, Oxford, CT (US); Christine Marie O'Connor, New Haven, CT (US)

(73) Assignee: Lockheed Martin Corporation, Bethesda, MD (US)

( * ) Notice: Subject to any disclaimer, the term of this patent is extended or adjusted under 35 U.S.C. 154(b) by 65 days.

(21) Appl. No.: 17/479,499

(22) Filed: Sep. 20, 2021

(51) Int. Cl.
*B64D 43/00* (2006.01)
*G01C 21/00* (2006.01)
*G08G 5/00* (2006.01)
*H04B 7/185* (2006.01)

(52) U.S. Cl.
CPC ......... *G01C 21/3807* (2020.08); *B64D 43/00* (2013.01); *G08G 5/0073* (2013.01); *H04B 7/18506* (2013.01)

(58) Field of Classification Search
CPC .. G01C 21/3807; B64D 43/00; G08G 5/0073; H04B 7/18506
See application file for complete search history.

(56) References Cited

U.S. PATENT DOCUMENTS

| | | |
|---|---|---|
| 8,264,379 B2 | 9/2012 | Whitlow et al. |
| 8,514,102 B2 | 8/2013 | Palanisamy et al. |
| 8,830,090 B2 | 9/2014 | Shafaat |

*Primary Examiner* — Mathew Franklin Gordon
(74) *Attorney, Agent, or Firm* — Michael Best & Friedrich LLP

(57) ABSTRACT

Systems and methods for detection and display of marine objects for an aircraft. One example system includes a transceiver configured to communicate with an Automatic Identification System (AIS) server and an electronic controller located within an aircraft. The electronic controller is configured to provide on a display an interface comprising a map representing a travel area. The electronic controller is configured to provide, on the map, a first graphical representation of the aircraft within the travel area. The electronic controller is configured to receive, via the transceiver, marine object data from the AIS server. The electronic controller is configured to periodically update, on the map, a second graphical representation of a first marine object within the travel area based on the marine object data.

20 Claims, 14 Drawing Sheets

MARINE TRAFFIC DEPICTION FOR PORTABLE AND INSTALLED AIRCRAFT DISPLAYS

FIELD

Embodiments described herein relate to user interfaces for depicting aircraft and, more particularly, to systems and methods for enhanced marine traffic depiction within user interfaces displayed via portable and installed aircraft displays.

SUMMARY

Operators of aircraft may deem it necessary to transition from instrument meteorological conditions (IMC) to visual meteorological conditions (VMC) while in an offshore environment. While transitioning between IMC and VMC, it may also be necessary for the operators to be cognizant of marine objects, such as boats, ships, oil rigs, aircraft carriers, and the like, within the offshore environment. Traditional electronic flight bag (EFB) applications may display marine objects based on signals received via an onboard radar of an aircraft. However, the radar may not always provide advanced information corresponding to these marine objects.

Furthermore, the radar can only provide general location information of these marine objects, and cannot provide additional data relating to these marine objects (for example, an identity, a length and beam, a type, a speed, a course, a navigational status, a rate of turn, a type of cargo, a destination, an estimated time of arrival (ETA), a route plan, and/or safety information). For example, the operator of an aircraft may want to perform an offshore approach path (OSAP) procedure to land on an offshore object, such as an oil rig or an aircraft carrier. The Federal Aviation Administration (FAA) currently provides two approved OSAP procedures, described in AC 90-80C, known as Offset and Delta-30. Traditionally, to perform an OSAP procedure, the operator follows an OSAP guide, which is typically printed on paper, which requires the operator to rapidly shift focus between inside and outside the cockpit of the aircraft. This may increase the difficulty of performing the OSAP procedure especially when there are additional obstacles or detrimental weather conditions.

To improve the accuracy and ease-of-use of EFB applications, it may be necessary to use a more accurate marine object detection system. However, many contemporary aircraft-based marine object detection systems rely on expensive equipment. Automatic identification systems (AIS) are currently used for marine-object-to-marine-object identification and are simpler and less expensive than equipment used for aircraft-to-marine-object identification. Furthermore, AIS is more accurate at determining marine object location than traditional radar systems and can provide additional information not provided by these traditional radar systems. In particular, traditional radar systems must be pointed at a specific marine object in order to send a signal directed at a marine object so that the signal bounces off of the marine object, and receive the signal after it has bounced off the marine object to confirm the location of the marine object. Therefore, radar alone cannot provide any early awareness of marine objects within a vicinity of the aircraft. By contrast, AIS relies on information regarding a large area received from a network server, and therefore can provide early awareness of marine objects within the vicinity of the aircraft.

Embodiments described herein provide systems and methods for providing a marine object detection system with enhanced marine object detection capabilities. Embodiments described herein provide enhanced EFB systems that, among other things, integrate automatic identification systems (AIS) into aircraft systems to provide more accurate, simpler, and less expensive marine object identification. Furthermore, embodiments described herein provide EFB systems that make additional functions available to operators of an aircraft, such as offshore approach path (OSAP) functions, search-and-rescue (SAR) functions, marine object intercept functions, aircraft ditching assistance functions, airborne delivery functions, return-to-home functions, coastal patrol functions, pirate patrol functions, policing functions, safety functions, and avoidance functions. Using such embodiments, operators are able to quickly and accurately identify marine objects within a vicinity of their aircraft and easily select a specific marine object for performing a function, such as landing on the selected marine object. Additionally, such embodiments reduce a need for the operator to switch focus in and out of the cockpit of their aircraft by providing identifying information of the surrounding marine objects directly within the aircraft rather than requiring the operator to identify surrounding marine objects by sight. Furthermore, in poor visibility, the operator may not be able to identify any marine objects by sight alone. Integrating AIS into the aircraft will allow for an operator to maintain awareness of marine objects in the vicinity of the aircraft even in poor visibility.

DETAILED DESCRIPTION

Figure 1:
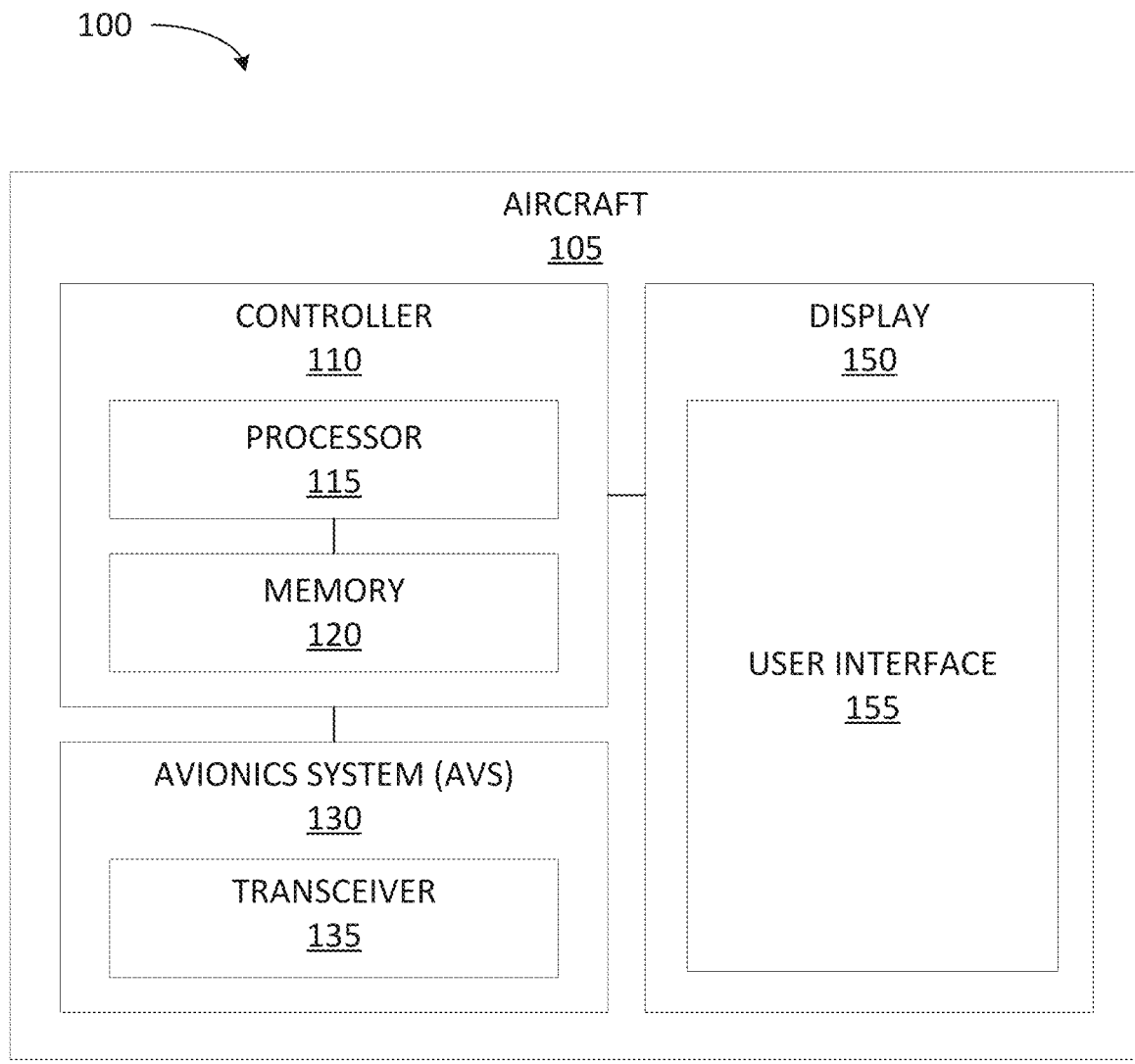
FIG. 1 schematically illustrates an aircraft system with enhanced marine object depiction capabilities, according to some embodiments.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Embodiments described herein provide systems and methods for providing a marine object detection system with enhanced marine object detection capabilities. Embodiments described herein provide systems and methods including automatic identification systems (AIS) incorporated into aircraft to provide more accurate, simpler, and less expensive marine object identification. Furthermore, embodiments described herein provide additional functions available to operators of an aircraft, such as offshore approach path (OSAP) functions, search-and-rescue (SAR) functions, marine object intercept functions, aircraft ditching assistance functions, airborne delivery functions, return-to-home functions, coastal patrol functions, pirate patrol functions, policing functions, safety functions, and avoidance functions.

In particular, one example embodiment provides a marine object detection system for use on an aircraft. The system includes a transceiver configured to communicate with an Automatic Identification System (AIS) server and an electronic controller located within the aircraft. The electronic controller is configured to provide an interface comprising a map representing a travel area. The electronic controller is configured to provide, on the map, a first graphical representation of the aircraft within the travel area. The electronic controller is configured to receive, via the transceiver, marine object data from the AIS server. The electronic controller is configured to periodically update, on the map, a second graphical representation of a first marine object within the travel area based on the marine object data.

Another example embodiment provides a method for depicting marine objects. The method includes providing, with an electronic processor, a marine traffic interface comprising a map representing a travel area. The method includes providing on the map, with the electronic processor, a first graphical representation of an aircraft within the travel area. The method includes receiving, with the electronic processor, marine object data from an AIS server. the method includes providing on the map, with the electronic processor, a second graphical representation of a first marine object within the travel area based on the marine object data.

Another example embodiment provides a graphical user interface configured to be displayed by a marine object detection system. The graphical user interface includes a map representing a travel area. The graphical user interface includes a first graphical representation of an aircraft within the travel area, the first graphical representation provided on the map. The graphical user interface includes a second graphical representation of a first marine object within the travel area, the second graphical representation provided on the map.

Figure 2:
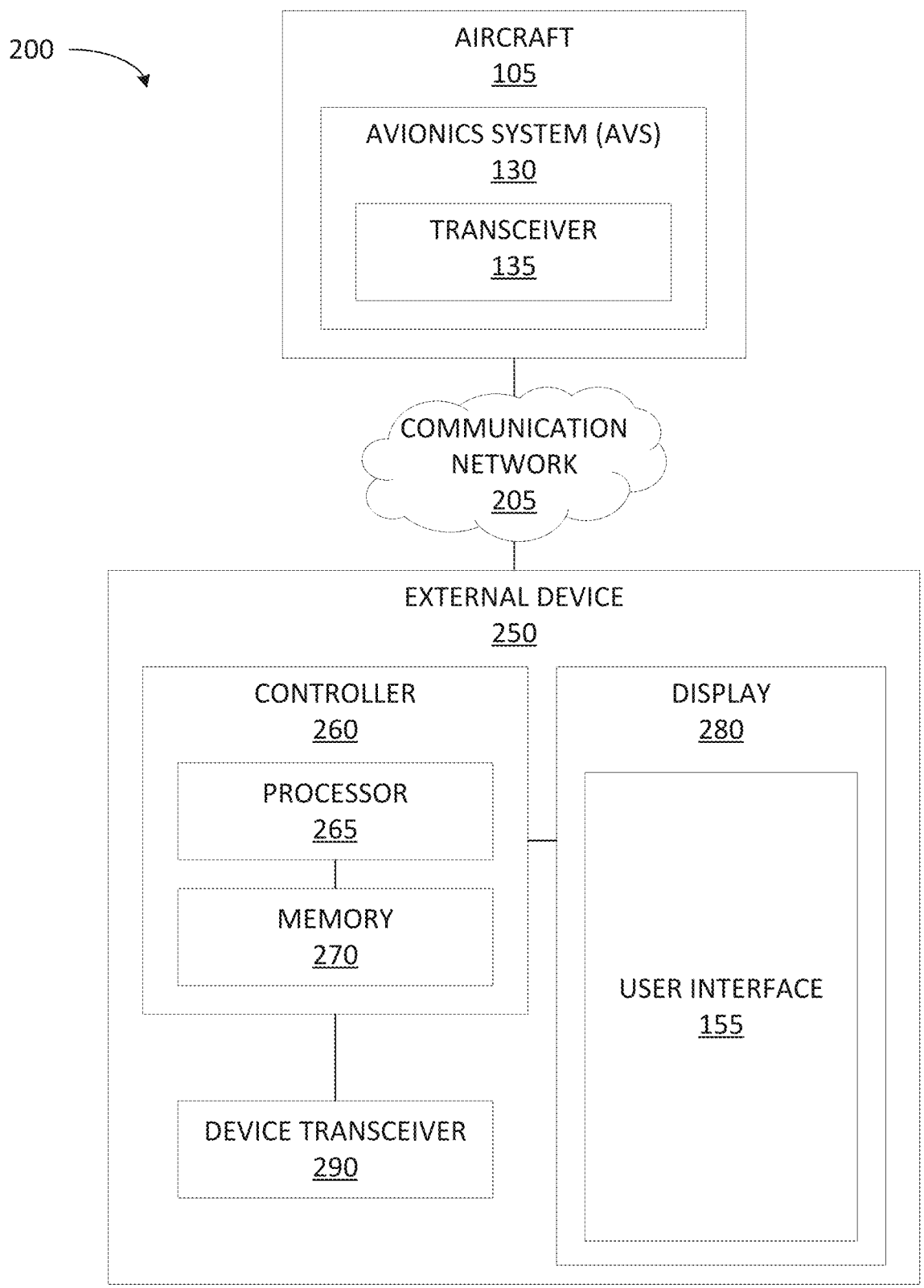
FIG. 2 schematically illustrates an alternative aircraft system with enhanced marine object depiction capabilities, according to some embodiments.

FIG. 1 illustrates a system 100 for providing an EFB application with enhanced marine object identification. According to the embodiment illustrated in FIG. 1, the system 100 is integrated into an aircraft 105. Other embodiments, such as the embodiment illustrated in FIG. 2, are also possible. Returning to FIG. 1, the aircraft 105 includes a controller 110, an avionics system (AVS) 130, and a display 150. The AVS 130 and display 150 may be electrically, mechanically, and/or communicatively coupled to the controller 110. The controller 110 is an electronic controller, which may include a processor 115 and a memory 120. The memory 120 may be a non-transitory computer-readable memory. The memory 120 may include one or more types of memory storage, such as random-access memory (RAM), flash memory, solid-state memory, or hard-drive memory. In addition, or alternatively, the controller 110 may communicate with a cloud-based storage system.

The AVS 130 includes at least a transceiver 135. The transceiver 135 is configured to send and receive radio wave signals to and from other aircraft. The radio wave signals may assist the aircraft 105 in identifying the location and navigational information of other aircraft, such as heading and speed. In some embodiments, the transceiver 135 may be configured to receive signals from marine objects located within a vicinity of the aircraft 105. In these embodiments, the transceiver 135 may be a radar transceiver. In addition, the radio wave signals may relay the location and navigational information of the aircraft 105 to other aircraft. In some embodiments, the transceiver 135 may also be configured to receive data from an automatic identification system (AIS). It is important to note that, for ease of description, the term AIS, as used herein, refers to a particular marine object identification system. However, in some embodiments, marine object identification systems other than MS may be used. In some embodiments, the AVS 130 may include multiple transceivers 135 configured to perform different communication types, such as an MS transceiver and a radar transceiver. In these embodiments, the AVS may aggregate data from the multiple transceivers to generate more accurate data. The AIS may assist the aircraft 105 in identifying the location and navigational information of marine objects, such as heading, speed, size, and the like. In these embodiments, the transceiver 135 may be a satellite transceiver, such as an Iridium transceiver. In some embodiments, the AVS 130 may include further systems, including, but not limited to, navigational systems, monitoring systems, aircraft flight-control systems, fuel systems, collision-avoidance systems, flight recorders, weather systems, and aircraft management systems. In some embodiments, the aircraft 105 may not receive location and navigational information of other aircraft from the AVS 130. Instead, the aircraft 105 may receive location and navigational information of other aircraft from a control tower, a cloud-based server, or the like.

In some embodiments, such as the embodiment illustrated in FIG. 1, the display 150 is integrated into the aircraft 105. For example, the display 150 may be electrically coupled to the controller 110, coupled to an instrument panel of the aircraft 105, or included in the AVS 130. In all embodiments, the display 150 provides a user interface 155 for an EFB application. In some embodiments, the display 150 include user input capabilities, such as a touch screen.

FIG. 2 illustrates an alternative system 200 for providing an EFB application with enhanced marine object identification. Unlike the system 100 illustrated in FIG. 1, the system 200 of FIG. 2 illustrates a distributed configuration. The system 200 may include the aircraft 105, AVS 130, and transceiver 135 of the system 100 of FIG. 1. The system 200 further includes a communication network 205. The communication network 205 may be a Wi-Fi network, a cellular network, a Bluetooth network, a satellite network, or the like. The communication network 205 provides communicative coupling between the aircraft 105 and an external device 250. The external device 250 may be a mobile device, such as a smart phone, a tablet computer, a laptop computer, or the like. In some embodiments, the external device 250 is a device separate from the internal systems of the aircraft 105, but still physically located within the aircraft 105. For example, in these embodiments the external device 250 may be a tablet computer, a mobile phone, or the like. In other embodiments, the external device 250 is located external to the aircraft 105, for example in a control tower.

The external device 250 includes a controller 260, a display 280, and a device transceiver 290. The device transceiver 290 and display 280 may be electrically, mechanically, and/or communicatively coupled to the controller 260. The controller 260 is an electronic controller, which may include a processor 265 and a memory 270. The memory 270 may be a non-transitory computer-readable memory. The memory 270 may include one or more types of memory storage, such as random-access memory (RAM), flash memory, solid-state memory, or hard-drive memory. In addition, or alternatively, the controller 260 may communicate with a cloud-based storage system. The device transceiver 290 is configured to send and receive signals to the aircraft 105 via the communication network 205. In some embodiments, the device transceiver 290 may additionally receive location and navigational information of other aircraft. In some embodiments, the device transceiver may additionally receive marine object information from an automatic identification system (AIS).

In some embodiments, such as the embodiment illustrated in FIG. 2, the display 280 is integrated into the external device 250, and not electrically or mechanically coupled to the aircraft 105. For example, the display 280 may be electrically and communicatively coupled to a mobile device, such as a smart phone or tablet computer. In all embodiments, the display 280 provides a user interface 155 for an EFB application. In some embodiments, the display 280 includes user input capabilities, such as a touch screen. Furthermore, other embodiments than the system 100 shown in FIG. 1 and the system 200 shown in FIG. 2 are possible. For example, some embodiments may distribute the components of the system 100 or 200 across multiple devices.

Figure 3:
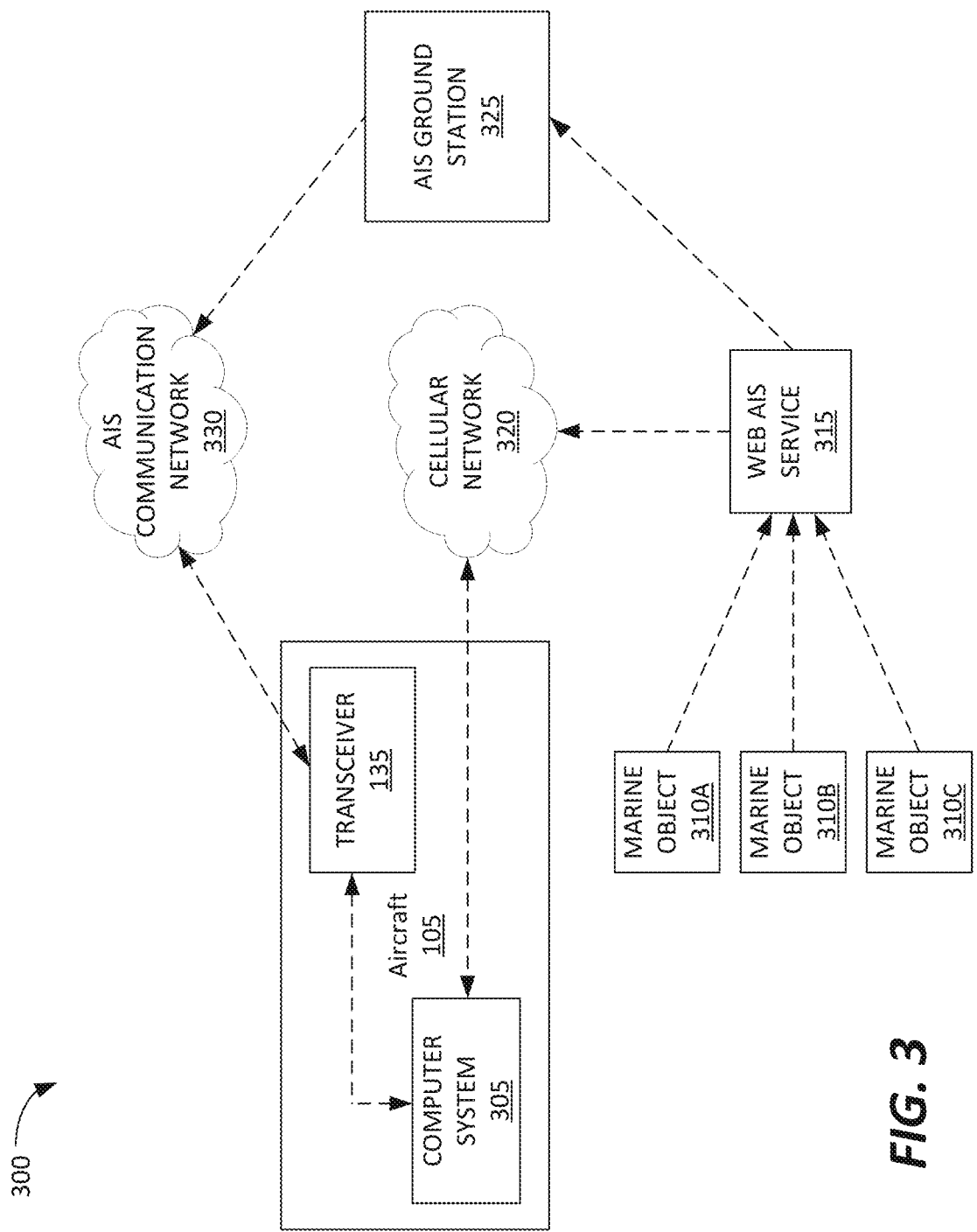
FIG. 3 illustrates a data path of an alternative aircraft system with enhanced marine object depiction capabilities, according to some embodiments.

FIG. 3 illustrates a data path 300 of an alternative aircraft system with enhanced marine object depiction capabilities. The data path 300 includes the aircraft 105 of FIG. 1 or FIG. 2. The aircraft 105 includes a transceiver 135. The transceiver 135 may be configured to send and receive communications over Wi-Fi, cellular networks, Bluetooth, or satellite. In some embodiments, the transceiver 135 is an Iridium satellite transceiver. The aircraft 105 may also include a computer system 305. The computer system 305 may include a processor, a memory, an input, an output, a display, and/or other components. In some embodiments, the computer system 305 may be the controller 110 and/or display 150 of FIG. 1. In other embodiments, the computer system 305 may be the external device 250 of FIG. 2. The computer system 305 may be configured to communicate with the transceiver 135 via a wireless connection, such as a Wi-Fi connection or a Bluetooth connection, or a wired connection.

The data path 300 may also include one or more marine objects 310A-C. The marine objects 310A-C may be boats, ships, oil rigs, aircraft carriers, or the like. The marine objects 310A-C may be stationary or mobile. The marine objects 310A-C may be configured to communicate with a web-based automatic identification system (AIS) service 315 via a wireless communication over Wi-Fi, cellular, Bluetooth, satellite, or the like. In some embodiments, the web MS service 315 may be provided by an external aviation data provider. The marine objects 310A-C may be configured to send data relating to a navigational status, a rate of turn, a type of cargo, a destination, an estimated time of arrival (ETA), a route plan, and/or safety information of the marine objects 310A-C. The web MS service 315 may be configured to communicate with the computer system 305 over a cellular network 320. The web AIS service 315 may be further configured to communicate with an MS ground station 325. The MS ground station 325 may be an earth-bound satellite dish. The AIS ground station 325 may be configured to communicate with the transceiver 135 via a satellite based AIS communication network 330. Therefore, the aircraft 105 may be able to receive data from an MS system over multiple networks, such as a cellular network 320 and/or a satellite based MS communication network. In some embodiments, the aircraft 105 may be configured to receive data from the MS service 315 and simultaneously receive signals from a transceiver (for example, the transceiver 135) corresponding to the locations of the marine objects 310A-C. In these embodiments, the aircraft 105 may aggregate the data from the MS service 315 and the data from the transceiver in order to generate more accurate location data of the marine objects 310A-C.

As noted herein, the AVS 130 may include a radar transceiver for detecting marine traffic. In some embodiments, the radar transceiver generates and sends radar data to the computer system 305. The radar data is indicative of, among other things, the size and location of marine objects (for example, the marine objects 310A-C). The computer system 305 combines the radar data with marine object data received from the MS service 315 to generate highly accurate location data for the marine objects. For example, the computer system 305 may compare locations for marine objects detected with the radar to locations provided by the MS service 315 to identify within the MS data sets the data for marine objects tracked by the AIS service that correspond to the marine objects detected by the aircraft radar.

Figure 4:
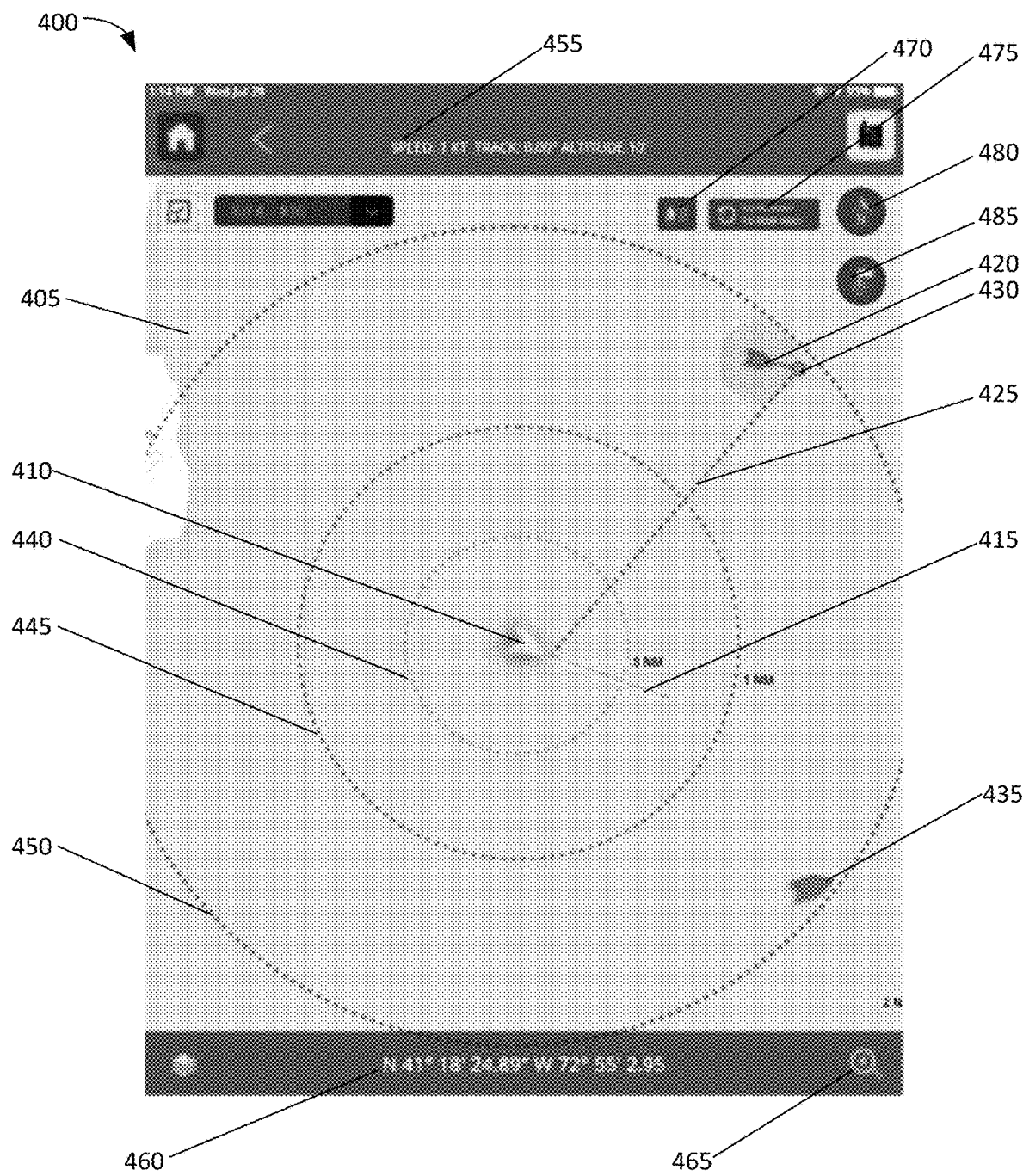
FIG. 4 is an example user interface for depicting a marine object intercept path, according to some embodiments.

FIG. 4 illustrates an example user interface 400 for depicting a marine object intercept path. The user interface 400 may include a map 405 of a travel area of an aircraft. The user interface 400 may further include a first graphical representation 410 of the aircraft and an aircraft trajectory indicator 415. In some embodiments, the aircraft is an ownship (i.e., an aircraft on which the user interface 400 is displayed). In these embodiments, the first graphical representation 410 of the aircraft and the aircraft trajectory indicator 415 may be based on internal location data of the aircraft. The user interface 400 further includes a second graphical representation 420 of a first marine object. The marine object may be a boat, a ship, an oil rig, an aircraft carrier, or the like. In some embodiments, the second graphical representation 420 is depicted within the travel area based on highly accurate location data produced by combining radar data and AIS service data, as noted herein. In such embodiments, the second graphical representation 420 is periodically updated based on changes in the highly accurate location data (for example, as the AIS service updates its data for the first marine object). In some embodiments, the user interface 400 may be configured to provide information related to an intercept operation between the aircraft and the first marine object. In these embodiments, upon receiving confirmation of performing the intercept operation, the user interface 400 may further display an intercept path 425 between the first graphical representation 410 and the second graphical representation 420. The user interface 400 may also display an intercept point 430 at which the aircraft will intercept the first marine object along the intercept path 425. In some embodiments, the user interface 400 may also include a third graphical representation 435 of a second marine object. In some embodiments, the user interface 400 may further include one or more rings indicating a radius around the aircraft. These rings may be centered about the first graphical representation 410. For example, FIG. 4 includes a first ring 440 indicating a radius of 0.5 nautical miles (NM), a second ring 445 indicating a radius of 1 NM, and a third ring 450 indicating a radius of 2 NM.

In some embodiments, the user interface 400 may include additional information relating to the aircraft and additional function buttons. For example, the user interface 400 may include a first information field 455 relating to a speed, track, and altitude of the aircraft and a second information field 460 relating to a latitudinal and longitudinal position of the aircraft. The user interface 400 may also include a zoom button 465 for altering a zoom level of the map 405. The user interface 400 may also include a vessel list button 470 for providing a list of all marine objects within a predetermined radius of the aircraft. The user interface 400 may also include a refresh AIS button 475 for requesting new data to be received from an AIS. The user interface may also include a north indicator 480. The user interface may also include a center button 485 for centering the user interface 400 on a destination of the aircraft, an origin of the aircraft, or a current location of the aircraft.

Figure 5:
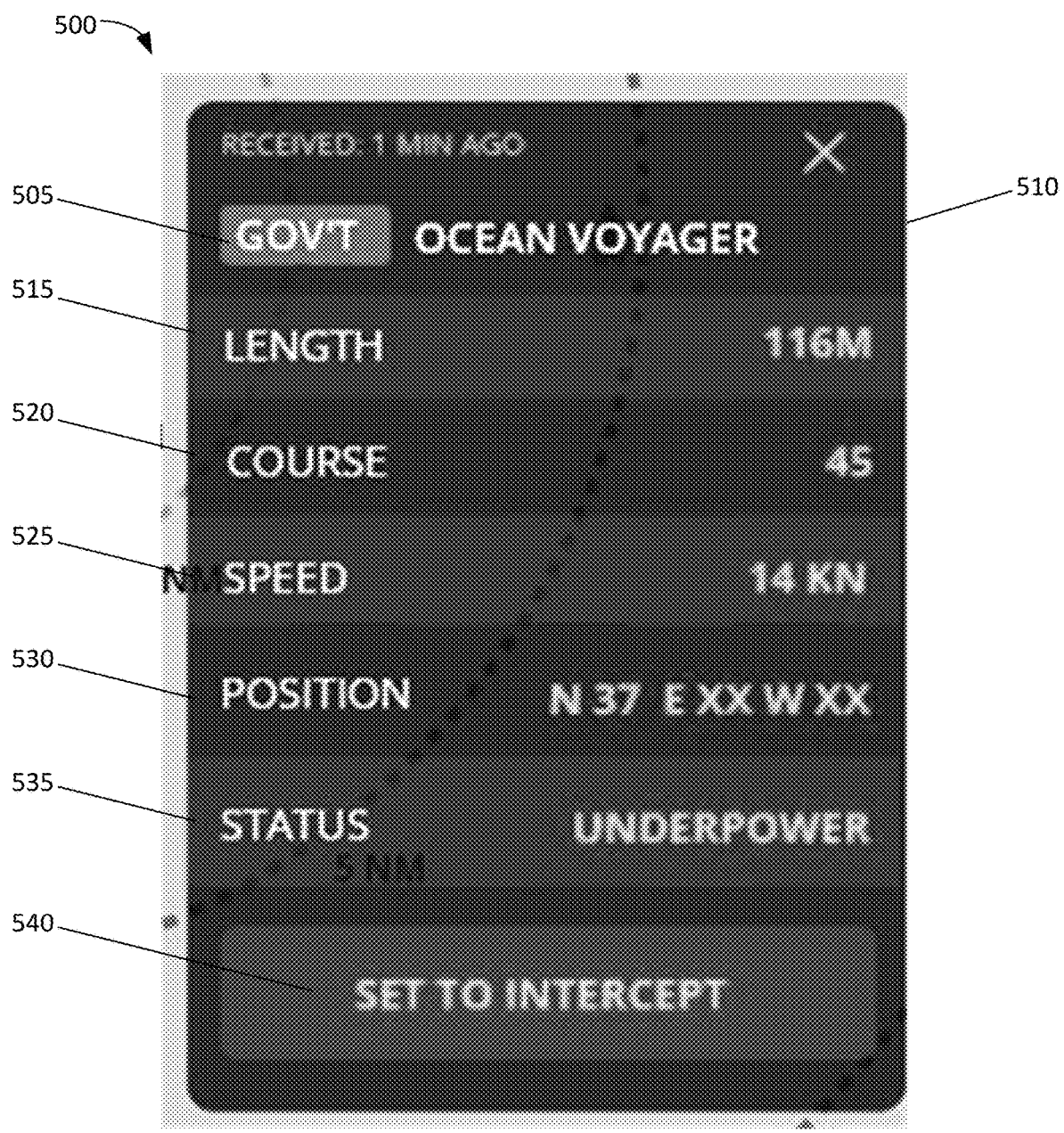
FIG. 5 is an example user interface for depicting marine object data, according to some embodiments.

FIG. 5 illustrates an example user interface 500 for depicting data relating to a marine object. In some embodiments, the user interface 500 may be generated in response to a selection of a representation of a marine object, for example the second graphical representation 420 or the third graphical representation 435 of FIG. 4. The user interface 500 may provide additional details relating to the selected marine object. For example, the user interface 500 may provide one or more fields corresponding to a type 505 (for example, government, civilian, military, etc.), a name 510, a length 515, a course 520, a speed 525, a position 530, and a status 535 of the selected marine object. The user interface 500 may also include an intercept button 540 for setting an intercept course between the aircraft and the selected marine object. In response to a selection of the intercept button 540, the user interface 500 may generate an intercept path and intercept point similar to those illustrated in FIG. 4.

Figure 6A:
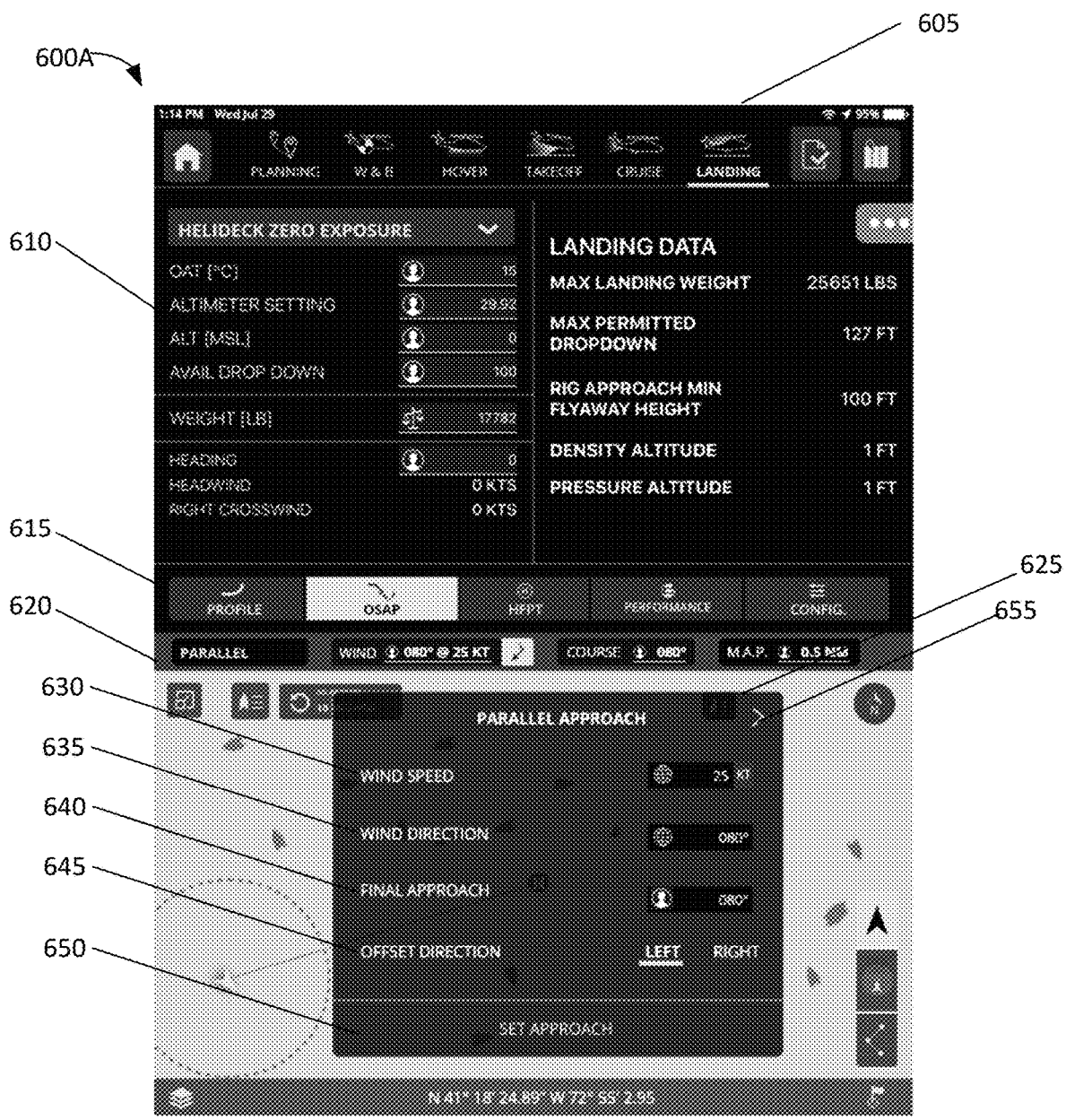
FIG. 6A is an example user interface for selecting an offshore approach path, according to some embodiments.

FIG. 6A illustrates a first example user interface 600A, at a first time, for selecting an offshore approach path. The first example user interface 600A may include a function tab menu 605 including one or more tabs corresponding to different functions of the aircraft. For example, FIG. 6A illustrates a planning tab, a W&B (weight and balance) tab, a hover tab, a takeoff tab, a cruise tab, and a landing tab. In FIG. 6A, the landing tab is selected. The first example user interface 600A may also include a settings panel 610 related to the selected tab for viewing or setting data related to the corresponding function. The settings panel 610 may further include an operation selection menu 615 for selecting a certain operation of the aircraft. For example, FIG. 6A illustrates a profile button, an offshore approach path (OSAP) button, a helideck/helicopter flight path tool (HFPT) button, a performance button, and a configuration button, with the OSAP button selected.

Upon a selection of a button from the operation selection menu 615, a traffic display panel 620 of the first example user interface 600A may transform to display a window corresponding to the selected button. For example, in response to the OSAP button being selected, an OSAP parameters entry window 625 may be generated. The OSAP parameters entry window 625 may include one or more fields for entering OSAP parameters. For example, the OSAP parameters entry window 625 may include a wind speed field 630, a wind direction field 635, a final approach field 640, and/or an offset direction field 645. The OSAP parameters entry window 625 may further include set approach button 650. In response to receiving a user input related to the set approach button 650, the traffic display panel 620 may be configured to generate an OSAP overlay. In some embodiments, a user may be prevented from activating the set approach button 650 until data has been entered into one or more of the fields. The OSAP parameters entry window 625 may further include an additional parameters arrow 655. In response to receiving a user input indicative of a user pressing the additional parameters arrow 655, the OSAP parameters entry window 625 may transform to include different fields.

Figure 6B:
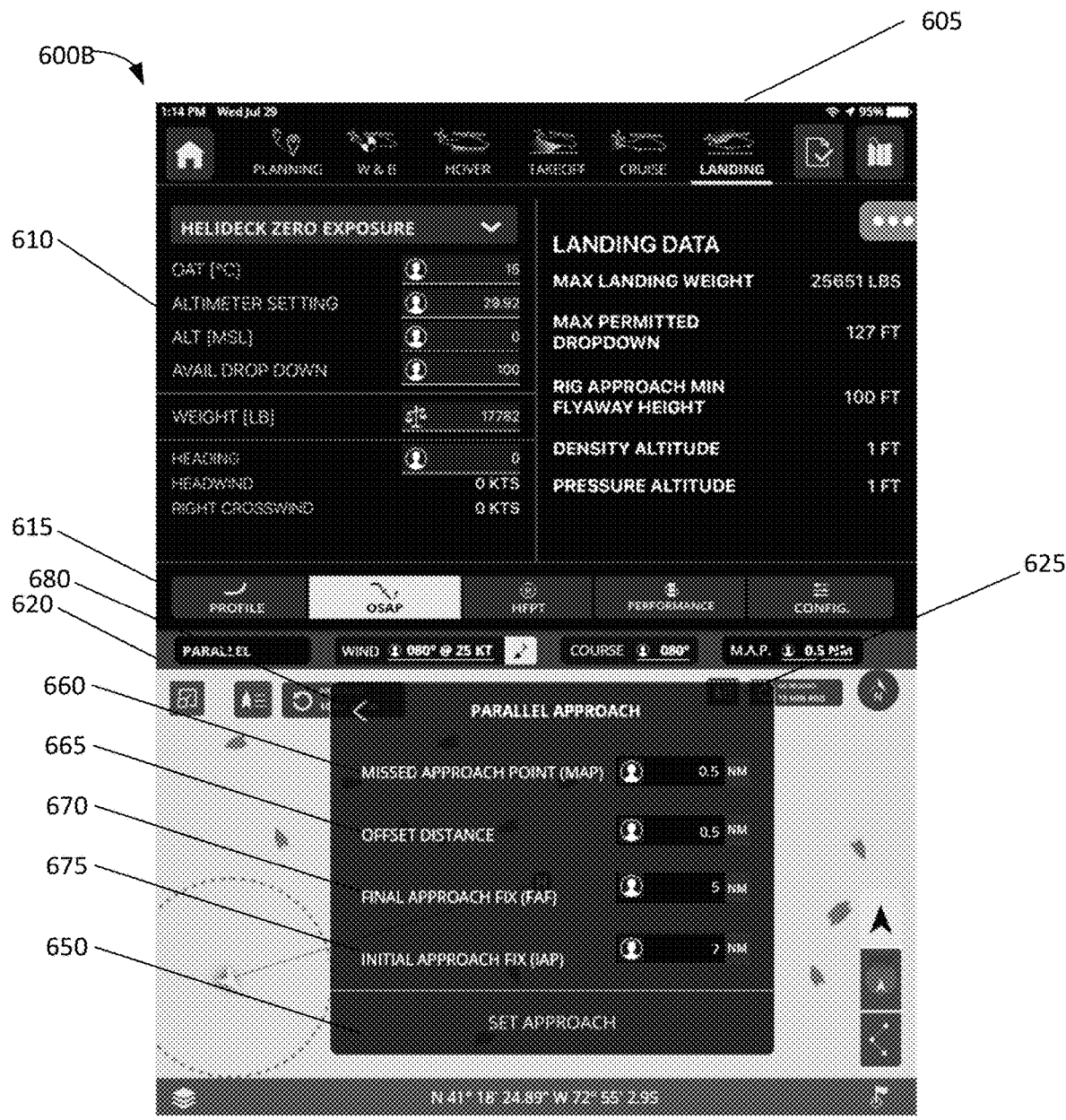
FIG. 6B is an example user interface for depicting an offshore approach path, according to some embodiments.

FIG. 6B illustrates a second example user interface 600B, at a second time, for selecting an offshore approach path. The second example user interface 600B may include similar elements as the first example user interface 600A, such as the function tab menu 605, the settings panel 610, the operation selection menu 615, the traffic display panel 620, and the OSAP parameters entry window 625. In some embodiments, the second example user interface 600B may be generated in response to a user selection of the additional parameters arrow 655 of the first example user interface 600A. In these embodiments, the OSAP parameters entry window 625 of the second example user interface 600B may transform to include different OSAP parameter fields. For example, as illustrated by FIG. 6B, the OSAP parameters entry window 625 includes a missed approach point field 660, an offset distance field 665, a final approach fix field 670, and/or an initial approach fix field 675. The OSAP parameters entry window 625 may further include the set approach button 650. The OSAP parameters entry window 625 may further include a previous parameters arrow 680. In response to receiving a user input indicative of a user selecting the previous parameters arrow 680, the OSAP parameters entry window 625 may transform to include the same fields as discussed herein with respect to FIG. 6A.

Figure 7A:
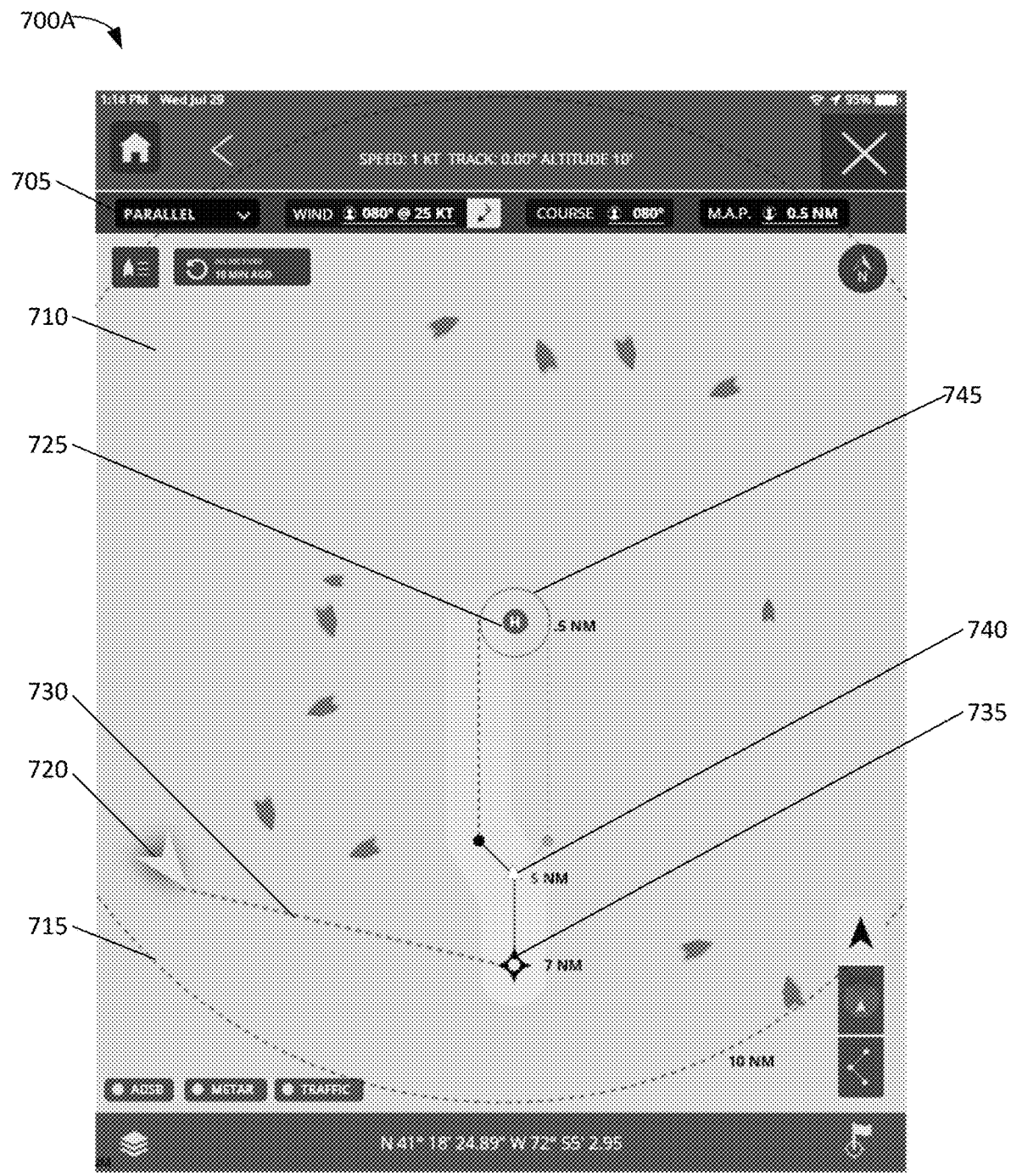
FIG. 7A is an example user interface for depicting an offshore approach path, according to some embodiments.

FIG. 7A illustrates a third example user interface 700A, at a third time, for depicting an offshore approach path. The third example user interface 700A may be generated in response to a selection of the set approach button 650 of FIG. 6A or 6B. The third example user interface 700A may include an approach path type menu 705. The approach path type menu may include one or more options of different approach paths. The third example user interface 700A may depict an approach path based on a selection of the approach path type menu 705. As illustrated in FIG. 7A, the selection is a Parallel approach path. The third example user interface 700A may further include a map 710 of a travel area of an aircraft, and an outer ring 715 illustrating an operating range of the aircraft. The third example user interface 700A may further include a first graphical representation 720 of the aircraft and a second graphical representation 725 of a marine objected selected by an operator of the aircraft as a landing zone. The third example user interface 700A may further include a flight path 730 between the first graphical representation 720 and an approach path start point 735 to direct an operator of the aircraft to the approach path start point 735. The third example user interface 700A may further include a depiction of an approach path 740 between the approach path start point 735 and the second graphical representation 725, based on the selection of the approach path type menu 705 and a predetermined radius 745 of the selected marine object. As illustrated in FIG. 7A, the depiction of the approach path 740 is a depiction of a Parallel approach path.

Figure 7B:
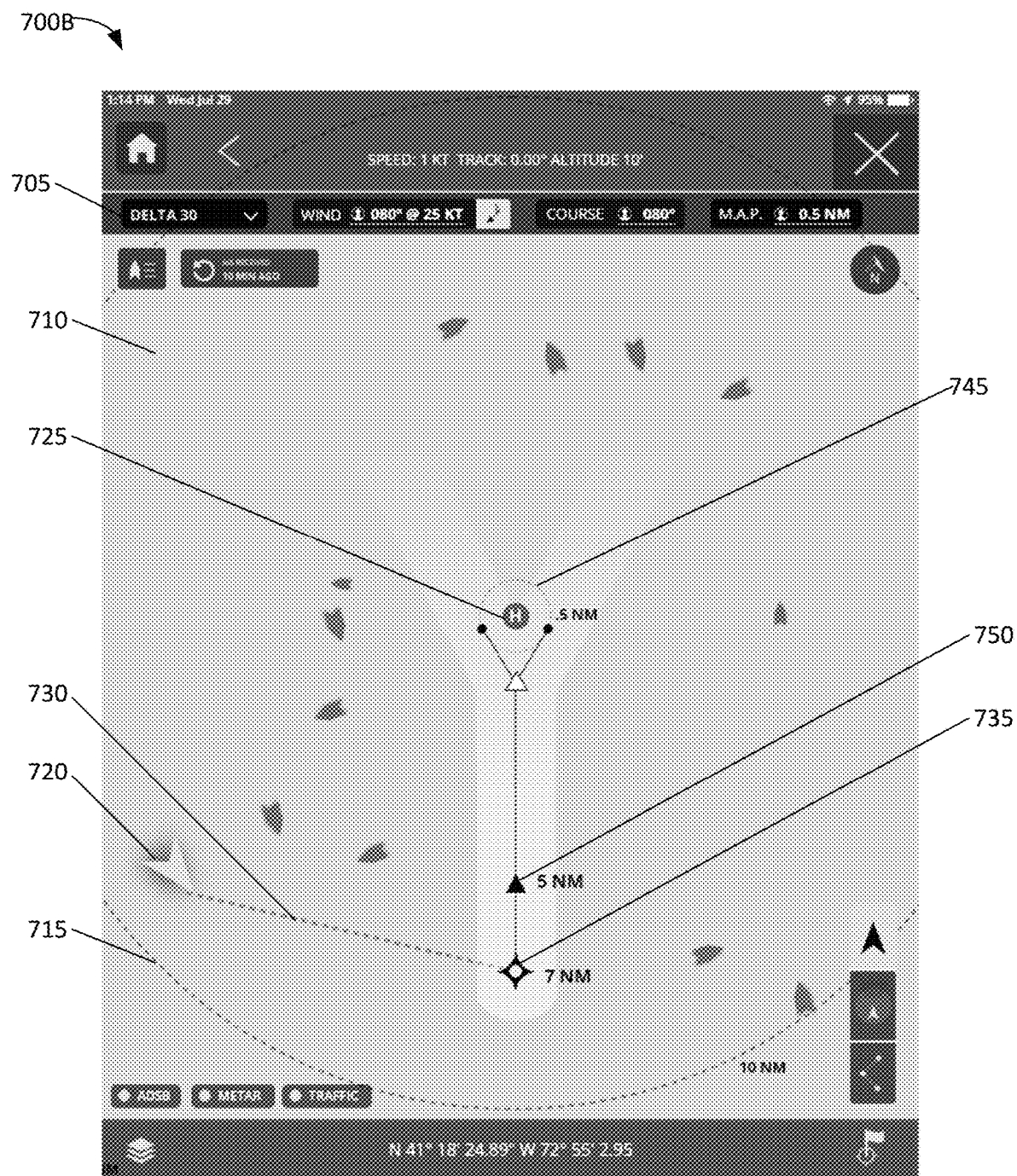
FIG. 7B is an example user interface for depicting an offshore approach path, according to some embodiments.

FIG. 7B illustrates a fourth example user interface 700B, at a fourth time, for depicting an offshore approach path. The fourth example user interface 700B may be generated in response to a selection of the set approach button 650 of FIG. 6A or 6B. The fourth example user interface 700B may include similar elements as the third example user interface 700A, such as the approach path type menu 705, the map 710 of the travel area of the aircraft, the outer ring 715 illustrating an operating range of the aircraft, the first graphical representation 720 of the aircraft, the second graphical representation 725 of a marine objected selected by an operator of the aircraft as a landing zone, and the flight path 730 between the first graphical representation 720 and the approach path start point 735 to direct an operator of the aircraft to the approach path start point 735. In some embodiments, the fourth example user interface 700B may be generated in response to changing the selection of the approach path type menu 705. For example, as illustrated in FIG. 7B, the selection is a Delta-30 path. The fifth example user interface 700B may further include a depiction of an approach path 750 between the approach path start point 735 and the second graphical representation 725, based on the selection of the approach path type menu 705 and the predetermined radius 745 of the selected marine object. As illustrated in FIG. 7B, the depiction of the approach path 750 is a depiction of a Delta 30 approach path.

Figure 7C:
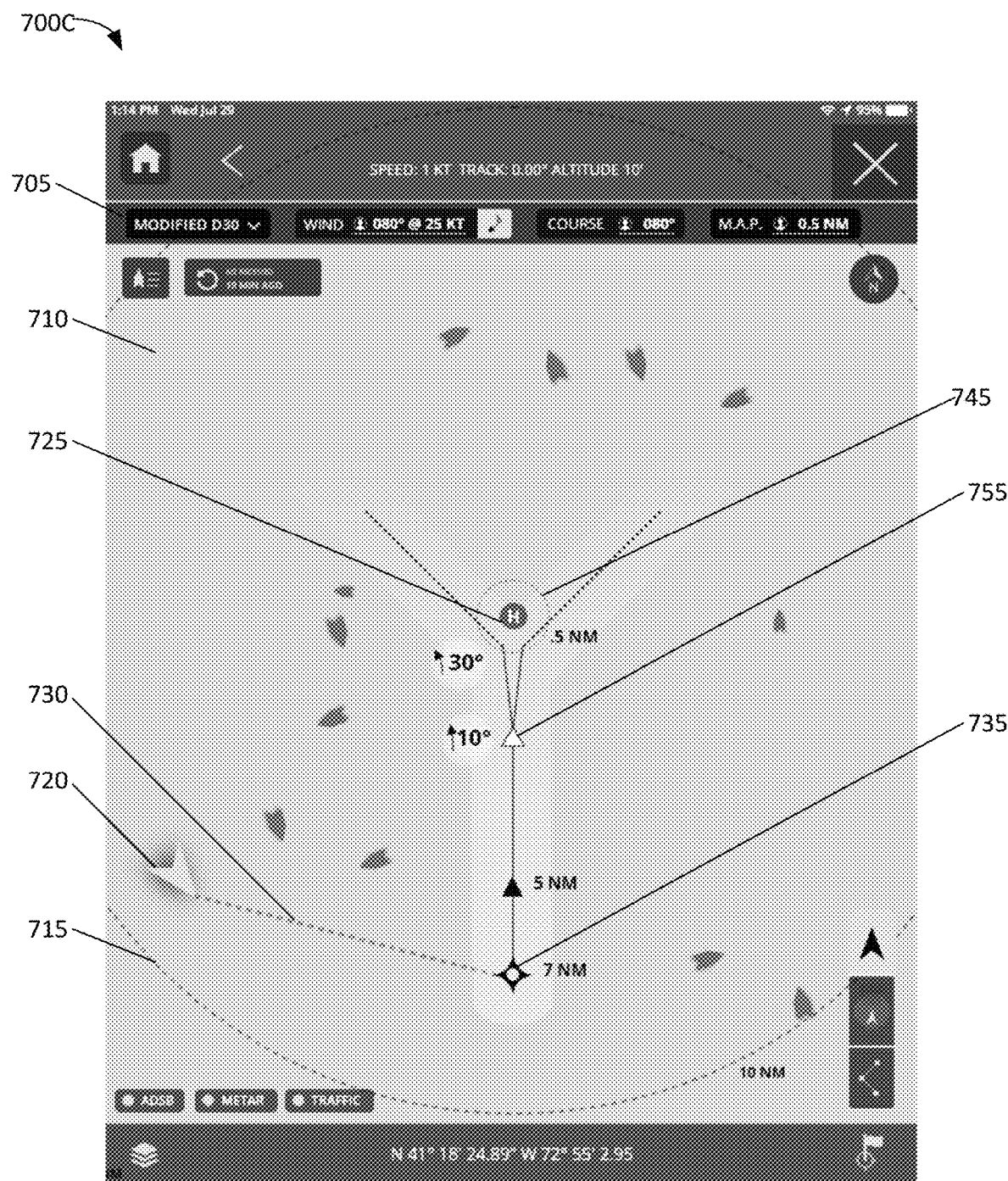
FIG. 7C is an example user interface for depicting an offshore approach path, according to some embodiments.

FIG. 7C illustrates a fifth example user interface 700C, at a fifth time, for depicting an offshore approach path. The fifth example user interface 700C may be generated in response to a selection of the set approach button 650 of FIG. 6A or 6B. The fifth example user interface 700C may include similar elements as the third example user interface 700A, such as the approach path type menu 705, the map 710 of the travel area of the aircraft, the outer ring 715 illustrating an operating range of the aircraft, the first graphical representation 720 of the aircraft, the second graphical representation 725 of a marine objected selected by an operator of the aircraft as a landing zone, and the flight path 730 between the first graphical representation 720 and the approach path start point 735 to direct an operator of the aircraft to the approach path start point 735. In some embodiments, the fifth example user interface 700C may be generated in response to changing the selection of the approach path type menu 705. For example, as illustrated in FIG. 7C, the selection is a modified Delta-30 path. The fifth example user interface 700C may further include a depiction of an approach path 755 between the approach path start point 735 and the second graphical representation 725, based on the selection of the approach path type menu 705 and the predetermined radius 745 of the selected marine object. As illustrated in FIG. 7C, the depiction of the approach path 755 is a depiction of a modified Delta 30 approach path.

Figure 8:
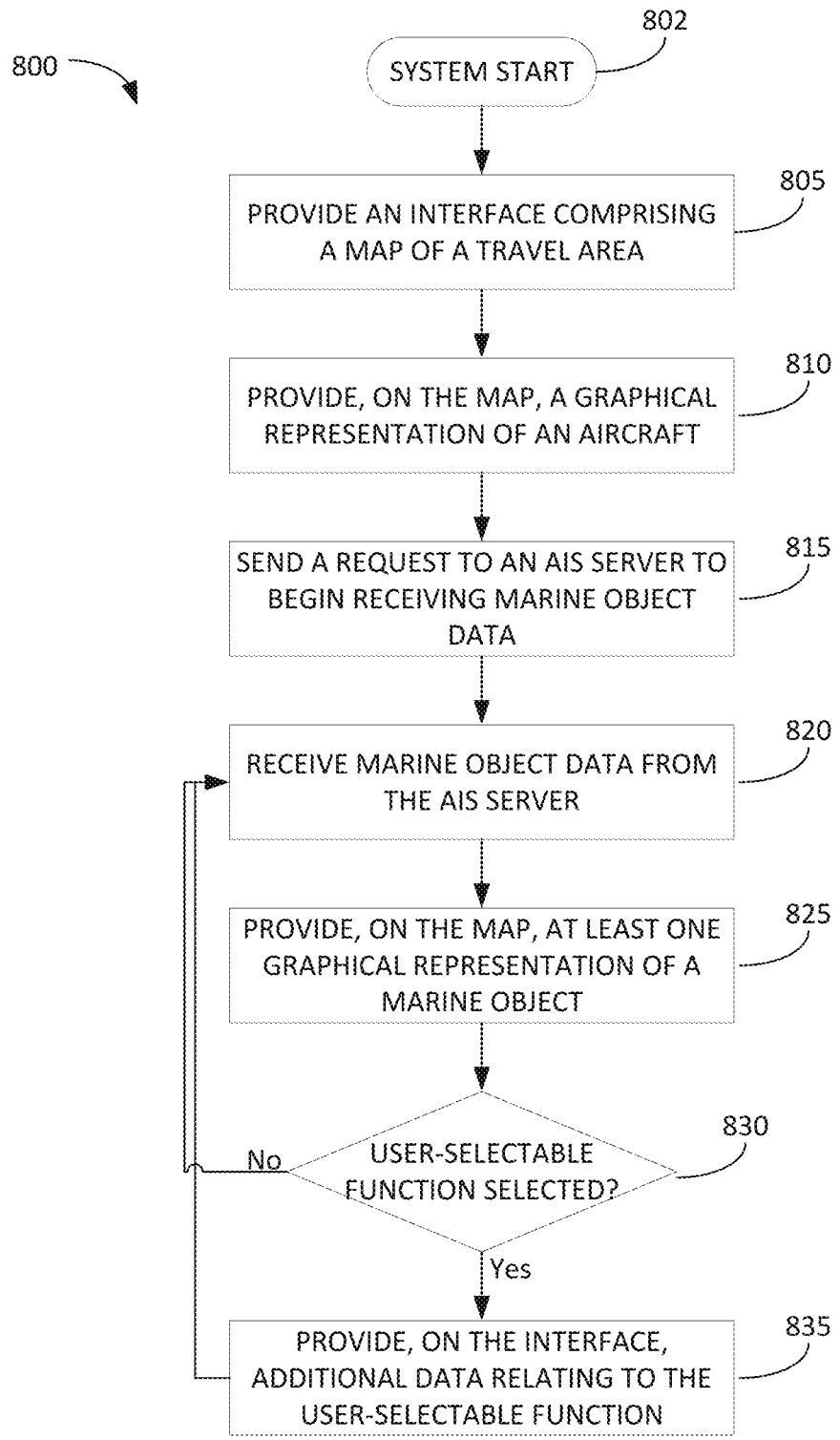
FIG. 8 is a flowchart illustrating a method of providing a user interface with enhanced marine object depiction capabilities, according to some embodiments.

FIG. 8 illustrates a flowchart illustrating a method 800 of providing a user interface with enhanced marine object depiction capabilities. The method 800 begins once a system implementing the method, such as the system 100 for providing an EFB application with enhanced marine object identification of FIG. 1 or the system 200 for providing an EFB application with enhanced marine object identification of FIG. 1, begins operation (BLOCK 802). The method 800 includes providing, on a display of the system, an interface comprising a map of a travel area of an associated aircraft (BLOCK 805). In some embodiments, the associated aircraft may be an aircraft connected to the system. The method 800 also includes providing, on the map, a graphical representation of the aircraft (BLOCK 810).

As described herein with respect to FIG. 1 and FIG. 2, the system may be in communication with an automatic identification system (AIS). The method may further include sending, via a transceiver, a request to an MS server to begin receiving marine object data within a predetermined area of the aircraft (BLOCK 815). The transceiver may be configured to send the request to the MS server over a Wi-Fi network, a cellular network, a satellite network, or a different wireless or wired communication network. In some embodiments, the request to begin receiving marine object data is only sent once. In other embodiments, the request to begin receiving marine object data is sent at regular intervals, for example every 15 seconds. Once the request has been sent and received by the MS server, the method 800 includes receiving marine object data from the MS server (BLOCK 820). The marine object data may be received by the transceiver at regular intervals (for example, every minute, every 10 seconds, every second, etc.).

The method 800 further includes providing, on the map, one or more graphical representations of a marine object (BLOCK 825). At least one graphical representation may be based on the marine object data received from the AIS server. At least one graphical representation may be periodically updated, for example, at intervals corresponding to an interval at which data is received from the MS server. In some embodiments, there may be no marine objects located within an area of the aircraft, and therefore no graphical representations of marine objects may be displayed. The method further includes determining if one of at least one user-selectable function has been selected (BLOCK 830).

The user selectable function may include an offshore approach path (OSAP) function, which provides a user with a depiction of an approach path from the aircraft to a selected marine object while in an offshore environment; a search-and-rescue (SAR) function, which directs a user to an area with a marine object in distress and provides the user with a search pattern to locate the marine object in distress; a marine object intercept function, which provides a user with a flight path to intercept a selected marine object; an aircraft ditching assistance function, which provides a user with a flight path to a landing point near a selected marine object and activates a beacon once the aircraft has landed; an airborne delivery function, which directs an operator of the aircraft to an intercept point near a selected marine object and instructs the operator to either land, drop, or hoist a package on the marine object; a return-to-home function, which provides a user with a flight path to a home marine object; a coastal patrol function, which provides a user with a coastal patrol plan; a pirate patrol function, which provides a user with a pirate patrol plan and information relating to pirate activity; a policing function, which provides a user with a policing patrol plan; a safety function, which can direct an operator of an aircraft to a friendly marine object; and an avoidance function, which provides a user with a path to avoid a specified area. If the method 800 determines that a user-selectable function has been selected, the method 800 further includes providing, on the interface, additional data relating to the selected user-selectable function (BLOCK 835). The method 800 then returns to BLOCK 820. In some embodiments, the method 800 returns to a block other than BLOCK 820. If the method 800 determines that a user-selectable function has not been selected, the method returns to BLOCK 820. In some embodiments, the method 800 returns to a block other than BLOCK 820.

Figure 9:
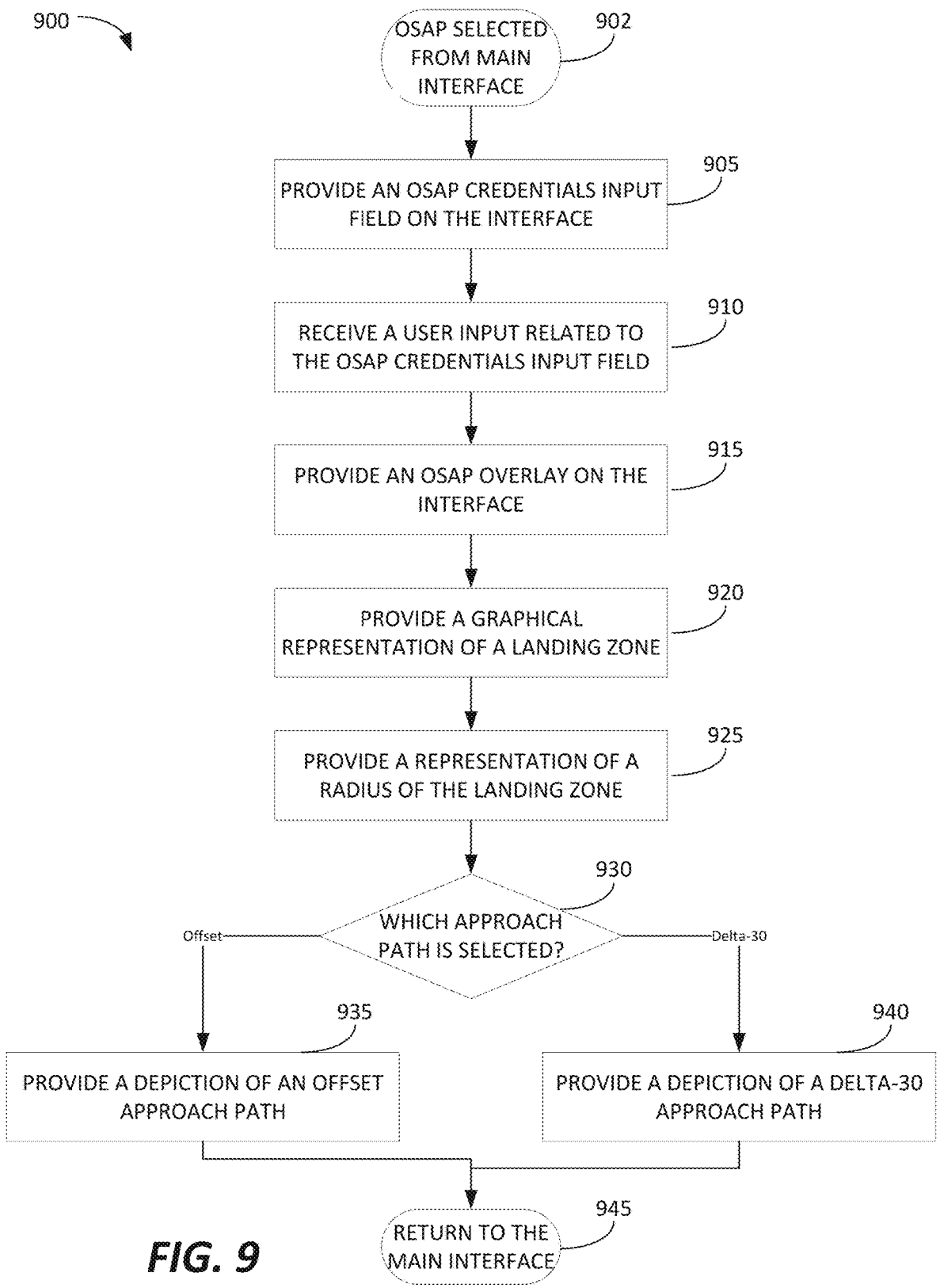
FIG. 9 is a flowchart illustrating a method of providing a user interface with an offshore approach path overlay, according to some embodiments.

FIG. 9 illustrates a flowchart illustrating a method 900 of providing a user interface with an offshore approach path overlay. The method 900 begins when a system detects that an OSAP function has been selected from a main interface (for example, in BLOCK 830 of method 800) (BLOCK 902). If an OSAP function has been selected, the method 900 includes providing at least one OSAP parameters input field on the interface (BLOCK 905). The method 900 then includes receiving a user input related to the OSAP parameters input field (BLOCK 910). Once the input has been received, the method includes providing an OSAP overlay on the interface (BLOCK 915), providing a graphical representation of a landing zone (BLOCK 920), and providing at least one representation of a radius around the landing zone (BLOCK 925).

The method 900 then determines what type of OSAP procedure has been selected (BLOCK 930). If an Offset procedure has been selected, the method 900 includes providing a depiction of an Offset approach path on the interface (BLOCK 935). If a Delta-30 procedure has been selected, the method 900 includes providing a depiction of a Delta-30 approach path on the interface (BLOCK 940). In some embodiments, the selectable OSAP procedures may include a modified Delta-30 procedure. In these embodiments if the modified Delta-30 procedure has been selected, the method 900 includes providing a depiction of a modified Delta-30 approach path on the interface. In some embodiments, other OSAP procedures beyond Offset, Delta-30, and modified Delta-30 may be included in the selectable OSAP procedures. Following either BLOCK 935 or BLOCK 940, the method 900 ends and returns to a main interface (for example, BLOCK 820 of the method 800) (BLOCK 945). In some embodiments, the method 900 may return to a previous block in the method 900 or wait for a user to exit the OSAP function before returning to the main interface.

In some embodiments, for example, where the method 900 is implemented on an external device 250 as described herein, the OSAP procedures are used to automatically execute a flight plan. In such embodiments, the controller 260 develops a flight plan for the aircraft using the selected OSAP procedure. The flight plan is exported to a flight management system of the aircraft (for example, to the AVS 130 via the communication network 205 using a suitable communication protocol), such that the aircraft can fly the procedure without the pilot having to make duplicate entries into the flight management system. In some embodiments, the system is configured to automatically create and execute the flight plan upon selection of the OSAP procedure. In some embodiments, the user interface 155 provides additional user inputs for initiating the automated flight plan based on the selected OSAP procedure.

Figure 10:
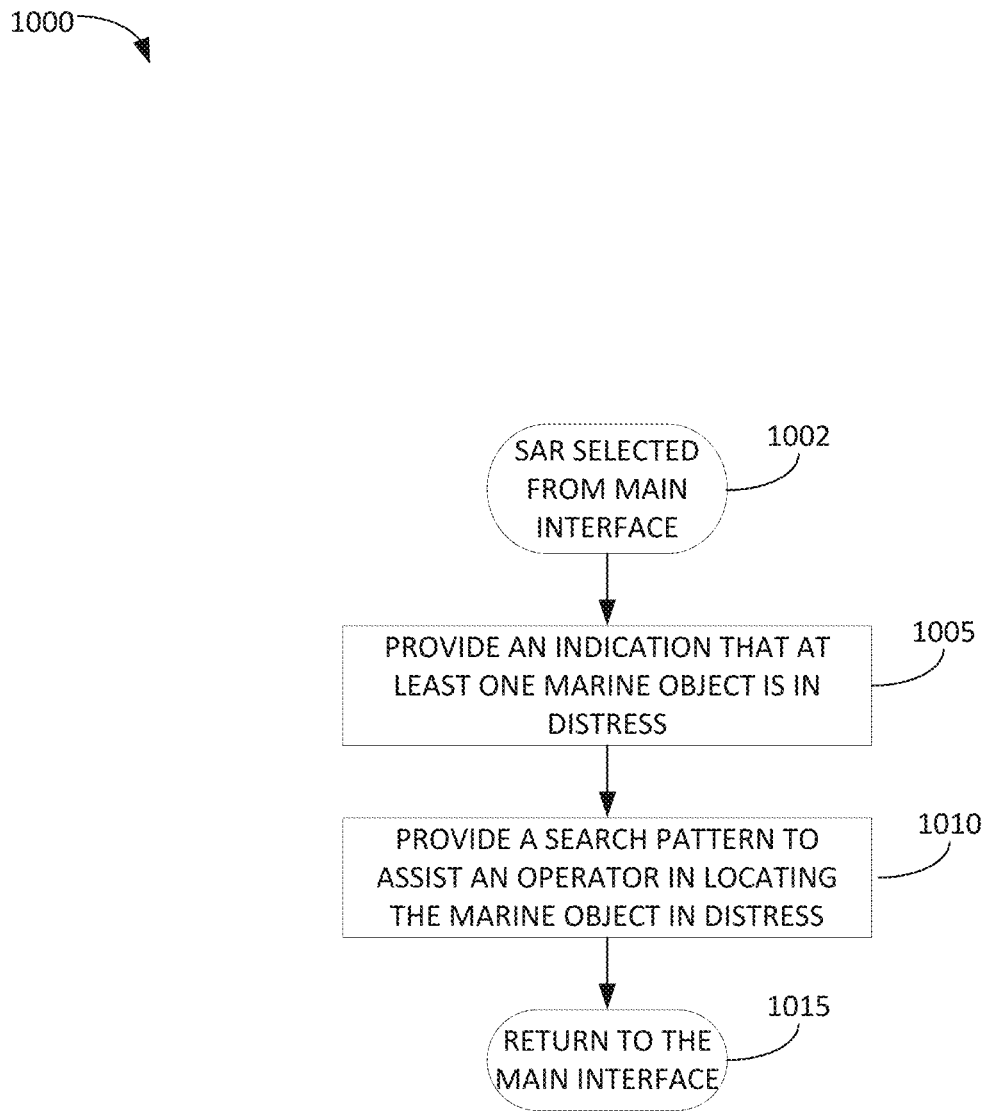
FIG. 10 is a flowchart illustrating a method of providing a user interface with a search and rescue overlay, according to some embodiments.

FIG. 10 illustrates a flowchart illustrating a method 1000 of providing a user interface with a search and rescue overlay. The method 1000 begins when a system detects that a search and rescue (SAR) function has been selected from a main interface (for example, in BLOCK 830 of method 800) (BLOCK 1002). If a SAR function has been selected, the method 1000 includes providing, on the interface, an indication that at least one marine object within an area of the aircraft is in distress (BLOCK 1005). The method 1000 may further include providing a search pattern to assist an operator of the aircraft in locating the marine object in distress (BLOCK 1010). Following BLOCK 1010, the method 1000 ends and returns to a main interface (for example, BLOCK 820 of the method 800) (BLOCK 1015). In some embodiments, the method 1000 may return to a previous block in the method 1000 or wait for a user to exit the SAR function before returning to the main interface.

Figure 11:
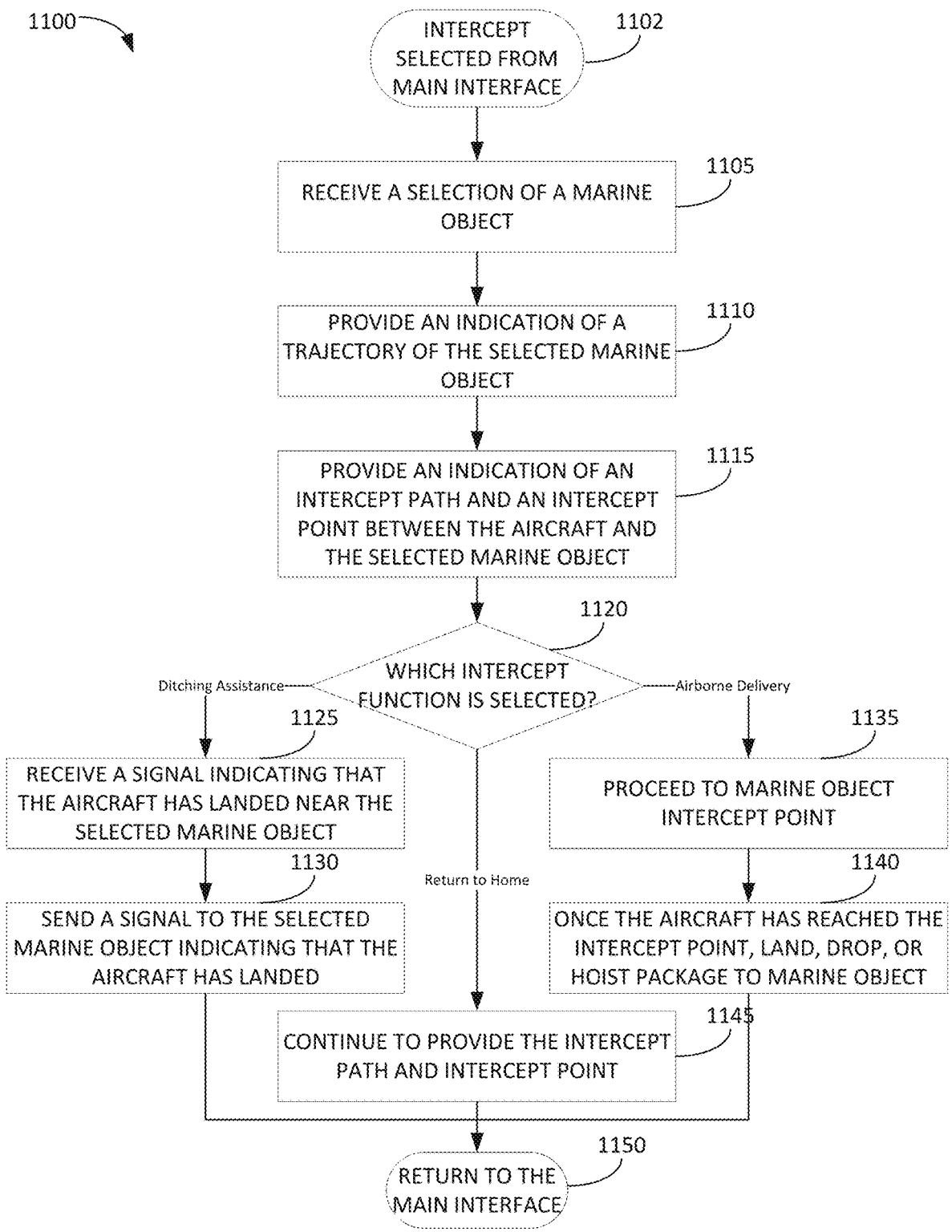
FIG. 11 is a flowchart illustrating a method of providing a user interface with an intercept overlay and for providing several intercept functions, according to some embodiments.

FIG. 11 illustrates a flowchart illustrating a method 1100 of providing a user interface with an intercept overlay and for providing several intercept functions. The method 1100 begins when a system detects that an intercept function has been selected from a main interface (for example, in BLOCK 830 of method 800) (BLOCK 1102). If an intercept function has been selected, the method 1100 includes receiving, by the interface, a selection of a marine object within an area of the aircraft (BLOCK 1105). The method 1100 then includes providing an indication of a trajectory of the selected marine object (BLOCK 1110) and providing an indication of an intercept path and an intercept point between the aircraft and the selected marine object (BLOCK 1115). Following BLOCK 1115, the method 1100 may then make a determination of a selected function incorporating an intercept procedure, for example, an aircraft ditching assistance function, an airborne delivery function, or a return-to-home function (BLOCK 1120).

If the method 1100 detects that an aircraft ditching assistance function has been selected, the method 1100 includes receiving a signal indicating that the aircraft has landed in the vicinity of the selected marine object (BLOCK 1125). Once the method 1100 has determined that the aircraft has landed, the method 1100 includes sending a signal to the selected marine object indicating that the aircraft has landed (BLOCK 1130). In some embodiments, the signal sent to the selected marine object may be a beacon indicating the position of the aircraft. In these embodiments, the beacon may be sent to all marine objects within a range of the beacon. Following BLOCK 1130, the method 1100 ends and returns to a main interface (for example, BLOCK 820 of the method 800) (BLOCK 1150). In some embodiments, the method 1100 may return to a previous block in the method 1100 or wait for a user to exit the aircraft ditching assistance function before returning to the main interface.

If the method 1100 detects that an airborne delivery function has been selected, the method 1100 includes directing an operator of the aircraft to proceed to the intercept point (BLOCK 1135). Once the method 1100 has determined that the aircraft has reached the intercept point, the method 1100 includes either landing on the marine object to deliver a package or another item, dropping the package or another item to the crew, or hoisting the package or another item to the crew (BLOCK 1140). Following BLOCK 1140, the method 1100 ends and returns to a main interface (for example, BLOCK 820 of the method 800) (BLOCK 1150). In some embodiments, the method 1100 may return to a previous block in the method 1100 or wait for a user to exit the airborne delivery function before returning to the main interface.

If the method 1100 detects that a return-to-home function has been selected, the method 1100 includes continuing to provide the intercept path and intercept point until the aircraft has reached the selected marine object (for example, the home vessel of the aircraft) (BLOCK 1145). Following BLOCK 1145, the method 1100 ends and returns to a main interface (for example, BLOCK 820 of the method 800) (BLOCK 1150). In some embodiments, the method 1100 may return to a previous block in the method 1100 or wait for a user to exit the return-to-home function before returning to the main interface.

Therefore, embodiments described herein provide systems and methods for detecting marine objects and displaying these marine objects to an operator of an aircraft via an enhanced marine object interface. The enhanced marine object interface may allow for the operator of the aircraft to quickly and efficiently identify marine objects within a vicinity of the aircraft, which enhances safe operations of the aircraft.

The graphical user interfaces provided herein provide improved user interfaces to, among other things, EFB systems. The improved user interface provides pilots with important flight data and control capabilities though a single interface, resulting in less systems needing to be accessed. This reduces the user interactions required to access necessary data, improves pilot situational awareness, and provides more efficient operation of the aircraft because, among other things, aircraft flight paths do not need to be adjusted or reworked midflight.

Various features and advantages of some embodiments are set forth in the following claims.

What is claimed is:

1. A marine object detection system configured for use on an aircraft, the marine object detection system comprising:
 a transceiver configured to communicate with an Automatic Identification System (AIS) server; and
 an electronic controller located within the aircraft, the electronic controller configured to:
  provide an interface comprising a map representing a travel area;
  provide, on the map, a first graphical representation of the aircraft within the travel area;
  receive, via the transceiver, marine object data from the AIS server; and
  periodically update, on the map, a second graphical representation of a first marine object within the travel area based on the marine object data.

2. The marine object detection system of claim 1, wherein the electronic controller is further configured to:
 provide, on the interface, a parameters input field; and
 in response to receiving an input relating to the parameters input field, provide, on the interface, an OSAP overlay;
 wherein the OSAP overlay comprises:
  a third graphical representation representing a landing zone within the travel area;
  a ring centered on the third graphical representation representing a predetermined radius around the landing zone; and
  a depiction of an approach path based on at least one selected from a group consisting of a Parallel approach path and a Delta 30 approach path.

3. The marine object detection system of claim 1, wherein the electronic controller is further configured to:
 provide, on the map, a third graphical representation of a second marine object within the travel area; and
 provide, on the map, at least one search pattern to guide an operator of the aircraft to locate the second marine object;
 wherein the third graphical representation indicates that the second marine object is in distress.

4. The marine object detection system of claim 1, wherein the electronic controller is further configured to:
 receive, by a user input, a selection of the first marine object;
 provide, on the map, a first indication of a trajectory of the first marine object; and
 provide, on the map, a second indication of an intercept path between the aircraft and the first marine object, the intercept path determined based on a location of the aircraft, a location of the first marine object, and the trajectory of the first marine object.

5. The marine object detection system of claim 4, wherein the electronic controller is further configured to:
 in response to determining that the aircraft has landed near the first marine object, send, via a beacon, a signal indicating that the aircraft has landed.

6. The marine object detection system of claim 4, wherein the electronic controller is further configured to:
 direct an operator of the aircraft to the first marine object based on the second indication of the intercept path; and
 in response to determining that the aircraft has intercepted the first marine object, instruct the operator to perform a function selected from a group consisting of landing on the second marine object, dropping an item to the second marine object, or hoisting an object to the second marine object.

7. The marine object detection system of claim 4, wherein the first marine object is a home vessel of the aircraft.

8. The marine object detection system of claim 1, wherein the electronic controller is further configured to:
provide, on the interface, additional information relating to at least one selected from a group consisting of a coastal patrol operation, a pirate patrol operation, a policing operation, a safety operation, and an avoidance operation.

9. The marine object detection system of claim 1, wherein the electronic controller and the transceiver are components of the aircraft.

10. The marine object detection system of claim 1, wherein the electronic controller and the transceiver are components of a mobile device.

11. The marine object detection system of claim 1, wherein the first marine object is one selected from a group consisting of a government marine vessel, a commercial marine vessel, an aircraft carrier, and an oil rig.

12. The marine object detection system of claim 1, wherein the electronic controller is further configured to send a request for the marine object data to the MS server at regular intervals.

13. The marine object detection system of claim 1, wherein the marine object data includes data relating to one or more marine objects, the one or more marine objects located within a 200 nautical mile radius of the aircraft.

14. The marine object detection system of claim 13, wherein the data relating to the one or more marine objects includes at least one selected from a group consisting of an identity, a length, a beam, a type, a position, a speed, a course, a navigational status, and safety information of each of the one or more marine objects.

15. The marine object detection system of claim 1, wherein a size of the second graphical representation is based at least in part on a height of the first marine object.

16. The marine object detection system of claim 1, wherein the marine object detection system further comprises a radar of the aircraft; and
wherein the electronic controller is further configured to:
receive radar data from the radar, the radar data being indicative of a location of the first marine object;
combine the radar data with the marine object data to generate highly accurate location data of the first marine object; and
periodically update, on the map, the second graphical representation of the first marine object within the travel area based on the highly accurate location data.

17. The marine object detection system of claim 1, wherein the electronic controller is further configured to:
receive, by a user input, a selection of the second graphical representation; and
provide, on the interface, data from the marine object data relating to the first marine object.

18. A method for detecting marine objects, the method comprising:
providing, with an electronic processor, a marine traffic interface comprising a map representing a travel area;
providing on the map, with the electronic processor, a first graphical representation of an aircraft within the travel area;
receiving, with the electronic processor, marine object data from an AIS server; and
providing on the map, with the electronic processor, a second graphical representation of a first marine object within the travel area based on the marine object data.

19. The method of claim 18, wherein the method further comprises providing on the marine traffic interface, with the electronic processor, at least one additional function selected from a group consisting of an Offshore Approach Path (OSAP) function, a search-and-rescue (SAR) function, a marine object intercept function, a ditching assistance function, an airborne delivery function, a return-to-home function, a coastal patrol function, a pirate patrol function, a policing function, a safety function, and an avoidance function.

20. A graphical user interface configured to be displayed by a marine object detection system, the user interface comprising:
a map representing a travel area;
a first graphical representation of an aircraft within the travel area, the first graphical representation provided on the map; and
a second graphical representation of a first marine object within the travel area, the second graphical representation provided on the map.

* * * * *